(12) United States Patent
McGuire et al.

(10) Patent No.: US 9,970,846 B2
(45) Date of Patent: May 15, 2018

(54) SYSTEM AND METHOD FOR DETERMINING HIGH FREQUENCY MULTI-DEGREE OF FREEDOM DYNAMIC PROPERTIES OF MOTOR VEHICLE CHASSIS COMPONENTS

(71) Applicant: GM GLOBAL TECHNOLOGY OPERATIONS LLC, Detroit, MI (US)

(72) Inventors: Michael E. McGuire, Milford, MI (US); Jinshuo Zhu, Novi, MI (US); Christopher A. Stirlen, Milford, MI (US)

(73) Assignee: GM GLOBAL TECHNOLOGIES OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/234,669

(22) Filed: Aug. 11, 2016

(65) Prior Publication Data

US 2018/0045612 A1  Feb. 15, 2018

(51) Int. Cl.
*G01M 17/04* (2006.01)
(52) U.S. Cl.
CPC .................................. *G01M 17/04* (2013.01)
(58) Field of Classification Search
CPC .................................................... G01M 17/04
USPC .............. 73/11.09, 116.01, 117.01, 663–669
See application file for complete search history.

(56) References Cited

U.S. PATENT DOCUMENTS

| | | | | |
|---|---|---|---|---|
| 3,074,269 A | * | 1/1963 | Wohl | G01M 7/04 310/27 |
| 2003/0200811 A1 | * | 10/2003 | Woyski | G01M 7/02 73/663 |
| 2011/0308296 A1 | * | 12/2011 | Sasso | G01C 19/72 73/1.77 |

* cited by examiner

*Primary Examiner* — Peter Macchiarolo
*Assistant Examiner* — Irving A Campbell
(74) *Attorney, Agent, or Firm* — Cantor Colburn LLP

(57) ABSTRACT

A system for determining dynamic properties of a chassis component includes a first fixture, a second fixture spaced from the first fixture, and a chassis component arranged between the first and second fixtures. The chassis component has a first end arranged at the first fixture and a second end arranged at the second fixture. A shaker system is arranged at the first end of the chassis component. A first multi-axis force transducer is arranged between the shaker system and the chassis component. The first multi-axis force transducer includes at least a 3 degree of freedom (DOF) sensing capability. A second multi-axis force transducer is arranged between the second end of the chassis component and the second fixture. The second multi-axis force transducer includes at least a 3 degree of freedom (DOF) sensing capability. A controller is coupled to the shaker system, and the first and second multi-axis dynamic force transducers.

20 Claims, 3 Drawing Sheets

SYSTEM AND METHOD FOR DETERMINING HIGH FREQUENCY MULTI-DEGREE OF FREEDOM DYNAMIC PROPERTIES OF MOTOR VEHICLE CHASSIS COMPONENTS

FIELD OF THE INVENTION

The subject invention relates to the art of testing devices and, more particularly, to a system and method for determining high frequency multi-degree of freedom dynamic properties of motor vehicle chassis components.

BACKGROUND

Motor vehicles include numerous components that interact with one another during operation. Some components interact directly, pistons/cylinders, cams/lifters, struts/wheels/road, etc., while other components interact indirectly, such as body and chassis components. In many cases, resilient members such as dampers, mounts and bushings are employed to reduce vibrational responses associated with both direct and indirect interactions. On occasion, vibrational responses may lead to undesirable noise in the motor vehicle. Manufacturers often employ low frequency, unrealistic input loads, and single axis testing systems to measure various component interactions. The above systems do not accurately model real life driving conditions. Accordingly, it is desirable to utilize a testing system and method for chassis components including dampers, mounts, and bushings, that more closely replicates actual road conditions.

SUMMARY OF THE INVENTION

In accordance with an exemplary embodiment, a system for determining high frequency multi-degree of freedom dynamic properties of a chassis component includes a support structure, a first fixture arranged on the support structure, a second fixture arranged on the support structure spaced from the first fixture, and a chassis component arranged between the first and second fixtures. The chassis component has a first end arranged at the first fixture and a second end arranged at the second fixture. A shaker system is arranged between the first fixture and the first end of the chassis component. The shaker system is operable to impart a frequency greater than about 20 Hz to the chassis component. A first multi-axis dynamic force transducer is arranged between the shaker system and the first end of the chassis component. The first multi-axis dynamic force transducer includes at least a 3 degree of freedom (DOF) sensing capability. A second multi-axis dynamic force transducer is arranged between the second end of the chassis component and the second fixture. The second multi-axis dynamic force transducer includes at least a 3 degree of freedom (DOF) sensing capability. A controller is coupled to the shaker system, and the first and second multi-axis dynamic force transducers. The controller operates to establish a selected frequency input and monitor a force transmission across the chassis component.

In accordance with another aspect of an exemplary embodiment, a method of determining high frequency multi-degree of freedom dynamic properties of a chassis component includes positioning a chassis component between a first fixture and a second fixture arranged on a support structure, arranging a shaker system arranged between the first fixture and a first end of the chassis component, positioning a first multi-axis dynamic force transducer including at least a 3 degree of freedom (3 DOF) sensing capability between the shaker system and the first end of the chassis component, positioning a second multi-axis dynamic force transducer including at least a 3 degree of freedom (3 DOF) sensing capability between a second end of the chassis component and the second fixture, supporting the chassis component, the shaker system and the first and second multi-axis dynamic force transducers between the first and second fixture above the support structure, activating the shaker to induce at least one of a selected frequency greater than about 20 Hz and a selected amplitude into the chassis component, and measuring a force transmission across the chassis component at the first and second multi-axis dynamic force transducers.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
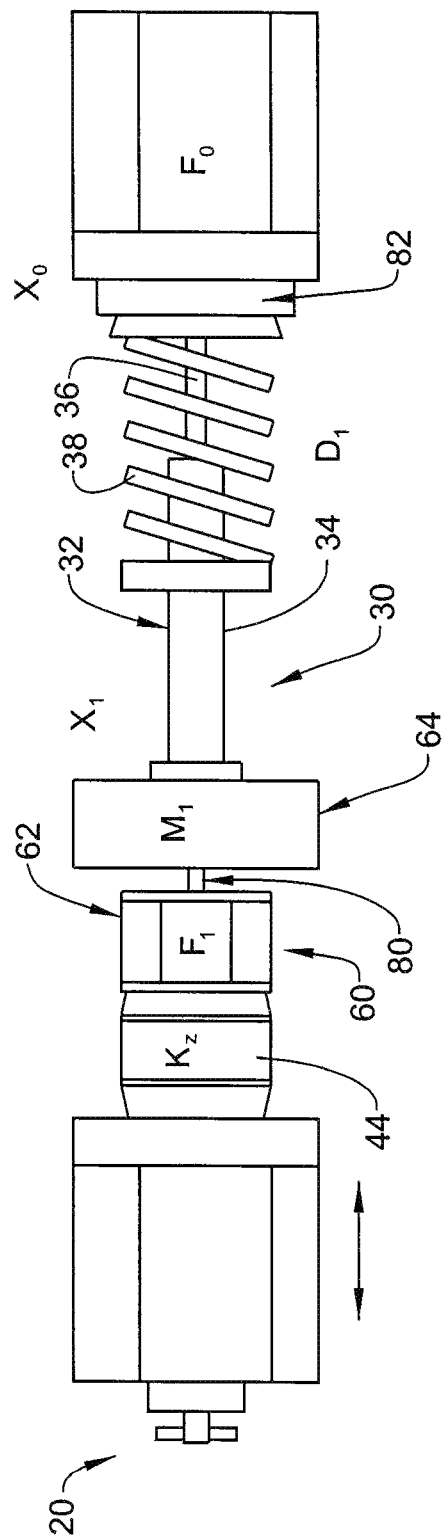
FIG. 1 is a top view of a multi-degree of freedom testing system for motor vehicle chassis components, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
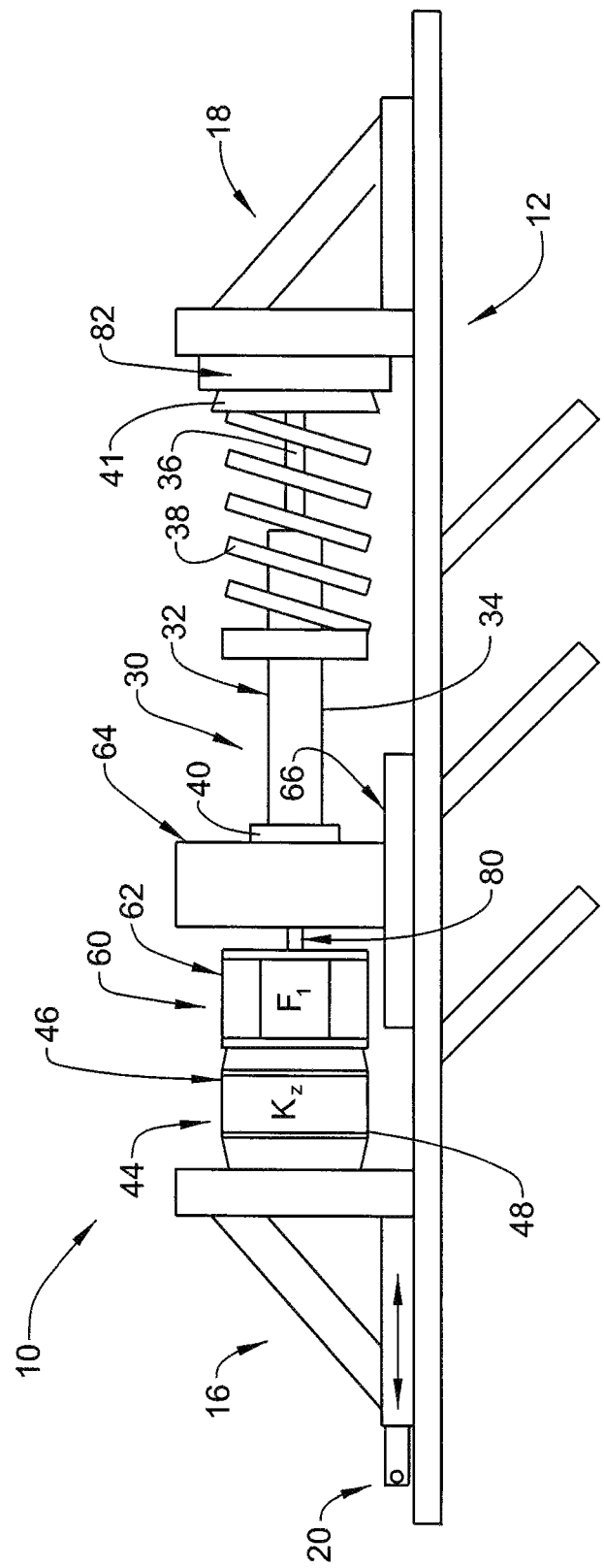
FIG. 2 is a side view of the multi-degree of freedom testing system for motor vehicle chassis components, in accordance with an aspect of an exemplary embodiment.

A multi-degree of freedom testing system for motor vehicle chassis components, in accordance with an exemplary embodiment, is illustrated generally at 10 in FIGS. 1 and 2. System 10 includes a support structure 12 upon which is arranged a first fixture 16 and a second fixture 18. First fixture 16 includes a preload adjustment mechanism 20. More specifically, through manipulation of adjustment mechanism 20, first fixture 16 may be shifted across support structure 12 to adjust a distance to second fixture 18. A chassis component, shown in the form of a damper 30 is arranged between first and second fixtures 16 and 18. Damper 30 may take the form of an automotive chassis or suspension component 32 such as a strut 34. It is to be understood that damper 30 may take on a variety of forms including mounts, bushings and/or other resilient members. Resilient members should be understood to be those members that substantially return to original form after being subjected to compression, tensile and/or other forces. As will be detailed more fully below, system 10 is employed to determine a force transmission across damper 30 based on various operating load inputs as a function of frequency. System 10 is designed to mimic real world conditions to determine how damper 30 transmits, for example, road noise.

In accordance with an aspect of an exemplary embodiment illustrated, strut 34 includes a hydraulic damping component 36 and a spring damping component 38 both of which may transmit road noise to passengers in an associated vehicle. Strut 34 includes a first end 40 arranged toward first fixture 16 and a second end 41 arranged toward second fixture 18. A biasing member 44 is arranged between first fixture 16 and first end 40. Biasing member 44 may apply a predetermined force or selected preload on first end 40. Biasing member 44 may take the form of a spring 46. In accordance with an aspect of an exemplary embodiment, spring 46 may take the form of a selectively adjustable air spring 48.

System 10 also includes a shaker system 60 operable to induce a selected frequency and input force that is passed into first end 40. In accordance with an aspect of an exemplary embodiment, shaker system 60 takes the form of a multi-axis shaker 62 capable of establishing a frequency input of at least 20 Hz and as much as 1000 Hz in multiple axes. A mass 64 is arranged between shaker system 60 and first end 40. A magnitude of mass 64 may be selectively adjusted based on a particular chassis component being tested. Mass 64 may rest upon an isolation pad 66. Isolation pad 66 decouples mass 64 from support structure 12. A first multi-axis dynamic force transducer 80 is arranged between shaker system 60 and mass 64 and a second multi-axis dynamic force transducer 82 is arranged between second end 41 of damper 30 and second fixture 18.

First and second multi-axis dynamic force transducers 80 and 82 are arranged to measure a corresponding one of frequency input into damper 30 and a dynamic response at second end 41 as will be detailed more fully herein. In accordance with an aspect of an exemplary embodiment, first multi-axis dynamic force transducer 80 may represent at least a three degree-of-freedom (3-DOF) force transducer measuring forces in at least three (3) axes. In accordance with another aspect of an exemplary embodiment, first dynamic force transducer 80 may represent a 6-DOF force transducer measuring forces in at least six (6) axes. Similarly, second multi-axis dynamic force transducer 82 may represent at least a three degree-of-freedom (3-DOF) force transducer measuring forces in at least three (3) axes. In accordance with another aspect of an exemplary embodiment, second dynamic force transducer 82 may represent a 6-DOF force transducer measuring forces in at least six (6) axes.

Figure 3:
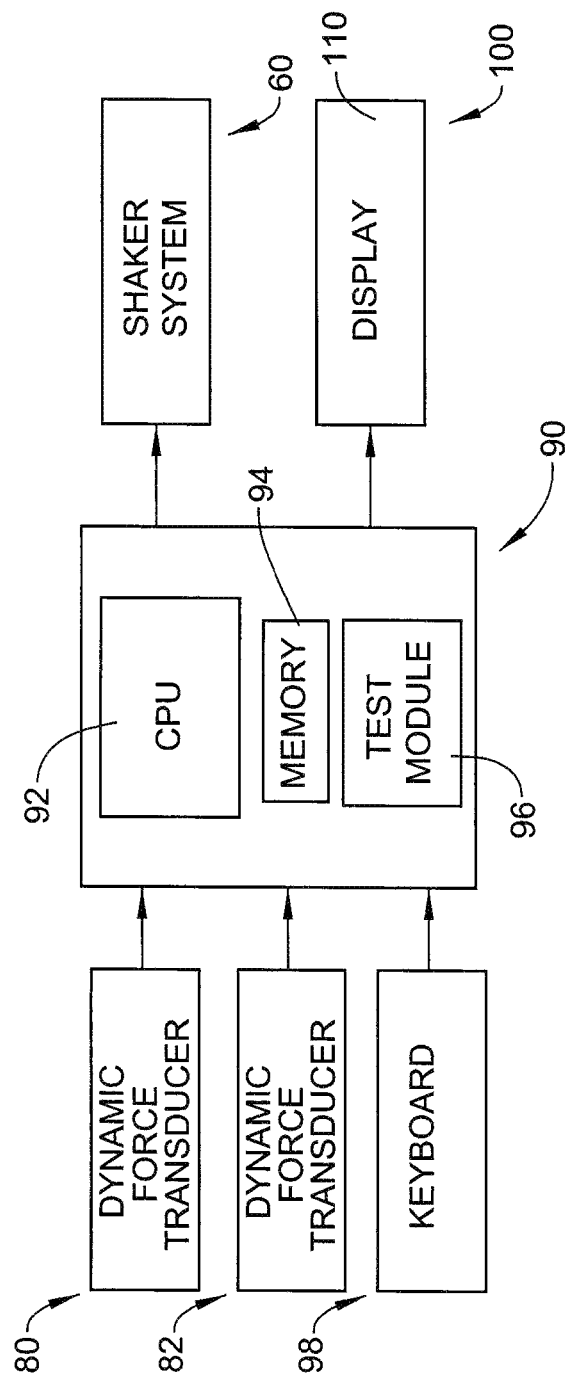
FIG. 3 is a block diagram illustrating a controller for the multi-degree of freedom testing system, in accordance with an aspect of an exemplary embodiment.

In further accordance with an exemplary embodiment, system 10 may include a controller 90 illustrated in FIG. 3. Controller 90 includes a central processing unit (CPU) 92, a non-volatile memory 94 and a test module 96. Controller 90 receives inputs from first and second multi-axis dynamic force transducers 80 and 82 as well as a manual entry device, such as a keyboard 98. Controller 90 is also operatively coupled to shaker system 60. Keyboard 98 may be employed to input known values, such as selected frequency output from shaker system 60, properties of mass 64 and damper 30 into controller 90. An output device 100 that may take the form of a display 110 is operatively connected to controller 90. Display 110 may present a dynamic response output from damper 30 for review and/or further investigation.

In accordance with an aspect of an exemplary embodiment, a user may input a selected frequency response from shaker system 60 into controller 90 along with various known values. Controller 90 may then actuate shaker system 60 to establish a selected frequency and amplitude input into first end 40 of damper 30. The selected amplitude may represent a modeled response to a suspension component interacting with a road surface. For example, the selected amplitude may be between about 0.01 m/s$^2$ to about 5 m/s$^2$. Controller 90 then receives sensed frequency and output response values from first multi-axis dynamic force transducer 80 and second multi-axis dynamic force transducer 82. Test module may employ one or more dynamics equations to calculate force transmission across damper 30 to establish a test response criteria for various chassis components to reduce transmission of road noise into a vehicle.

For example, system 10 may be employed to determine various dynamic properties of strut 34 including Dynamic stiffness ($D_1$), a loss function ($\eta$) and/or force transmissibility (T) based on the equations below. Dynamic stiffness ($D_1$) may be determined based on transfer stiffness when a displacement is applied at one side of strut 34 and a blocked or grounded force is determined at an opposing side of strut 34. Loss function ($\eta$) of strut 34 may be determined based on dynamic stiffness phase shift, or a ratio of its imaginary part over its real part. Force transmissibility (T) may be determined based on a force ratio of transmitted force ($F_0$) over an applied force ($F_1$). Force transmissibility may be affected by the fixture mass $M_1$. Calculated force transmissibility ($T^i$) represents force transmissibility corrected by removing fixture mass $M_1$ from calculations. The formula involves the use of the measured transfer function $H_{11}$. $H_{11}$ is the ratio of the displacement over the force at fixture mass $M_1$ $\omega$ is the rotational frequency, and $K_2$ represents a stiffness value of biasing member 44.

$$D_1 = X_1/F_0 \qquad (1)$$

$$\eta = (I_m(D_1))/(Re(D_1)) \qquad (2)$$

$$T = F_0/F_1 \qquad (3)$$

$$T^i = D_{10}/D_{11} = T*1/(1-(K_2-\omega^2 M_1)H_{11}) \qquad (4)$$

$$H_{11} = X_1/F_1 \qquad (5)$$

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for determining high frequency multi-degree of freedom dynamic properties of a chassis component comprising:
   a support structure;
   a first fixture arranged on the support structure;
   a second fixture arranged on the support structure spaced from the first fixture;
   a chassis component arranged between the first and second fixtures, the chassis component having a first end arranged at the first fixture and a second end arranged at the second fixture;

a shaker system arranged between the first fixture and the first end of the chassis component, the shaker system being operable to impart a frequency greater than 20 Hz to the chassis component;

a first multi-axis dynamic force transducer arranged between the shaker system and the first end of the chassis component, the first multi-axis dynamic force transducer including at least a 3 degree of freedom (DOF) sensing capability;

a second multi-axis dynamic force transducer arranged between the second end of the chassis component and the second fixture, the second multi-axis dynamic force transducer including at least a 3 degree of freedom (DOF) sensing capability; and a controller coupled to the shaker system, and the first and second multi-axis dynamic force transducers, the controller operating to establish a selected frequency input and monitor a force transmission across the chassis component.

2. The system according to claim 1, further comprising: a biasing member arranged between the first fixture and the shaker system, the biasing member decoupling the chassis component from the first fixture.

3. The system according to claim 2, wherein the biasing member comprises a spring.

4. The system according to claim 3, wherein the spring comprises a selectively adjustable air spring.

5. The system according to claim 1, further comprising: an adjustment mechanism operatively associated with the first fixture, the adjustment mechanism operating to shift the first fixture along the support structure to establish a selected preload on the chassis component.

6. The system according to claim 1, wherein the first multi-axis dynamic force transducer includes at least a 6 degree of freedom (6 DOF) sensing capability.

7. The system according to claim 1, wherein the second multi-axis dynamic force transducer includes at least a 6 degree of freedom (6 DOF) sensing capability.

8. The system according to claim 1, wherein the selected frequency input is between about 20 Hz and about 1000 Hz.

9. The system according to claim 1, wherein the chassis component comprises a suspension component.

10. The system according to claim 9, wherein the suspension component comprises a strut including a hydraulic damping component and a spring damping component.

11. A method of determining high frequency multi-degree of freedom dynamic properties of a chassis component, the method comprising:

positioning a chassis component between a first fixture and a second fixture arranged on a support structure;

arranging a shaker system arranged between the first fixture and a first end of the chassis component;

positioning a first multi-axis dynamic force transducer including at least a 3 degree of freedom (3 DOF) sensing capability between the shaker system and the first end of the chassis component positioning a second multi-axis dynamic force transducer including at least a 3 degree of freedom (3 DOF) sensing capability between a second end of the chassis component and the second fixture;

supporting the chassis component, the shaker system, the first multi-axis dynamic force transducer and the second multi-axis dynamic force transducers between the first and second fixture above the support structure;

activating the shaker system to induce at least one of a selected frequency greater than about 20 Hz and a selected amplitude into the chassis component; and measuring a force transmission across the chassis component at the first and second multi-axis dynamic force transducers.

12. The method of claim 11, further comprising: decoupling the chassis component from the first fixture.

13. The method of claim 12, wherein decoupling the chassis component from the first fixture includes installing a biasing member between the first fixture and the shaker system.

14. The method of claim 12, further comprising: installing a biasing member between the first fixture and the shaker system.

15. The method of claim 14, wherein positing the biasing member includes arranging a selectively adjustable air spring between the first fixture and the chassis component.

16. The method of claim 11, further comprising: establishing a selected preload on the chassis component.

17. The method of claim 16, wherein establishing the selected preload includes shifting the first fixture relative to the second fixture along the support structure.

18. The method of claim 11, wherein measuring the force transmission includes sensing the at least one of the selected frequency and the selected amplitude at the first multi-axis dynamic force transducer along at least 6 axes.

19. The method of claim 11, wherein measuring the force transmissibility includes sensing the at least one of the selected frequency and the selected amplitude at the second multi-axis dynamic force transducer along at least 6 axes.

20. The method of claim 11, wherein positioning the chassis component between the first and second fixtures includes arranging a suspension component between the first and second fixtures.

* * * * *